No. 628,407. W. W. KENFIELD. Patented July 4, 1899.
GEARING.
(Application filed Apr. 21, 1899.)
(No Model.)
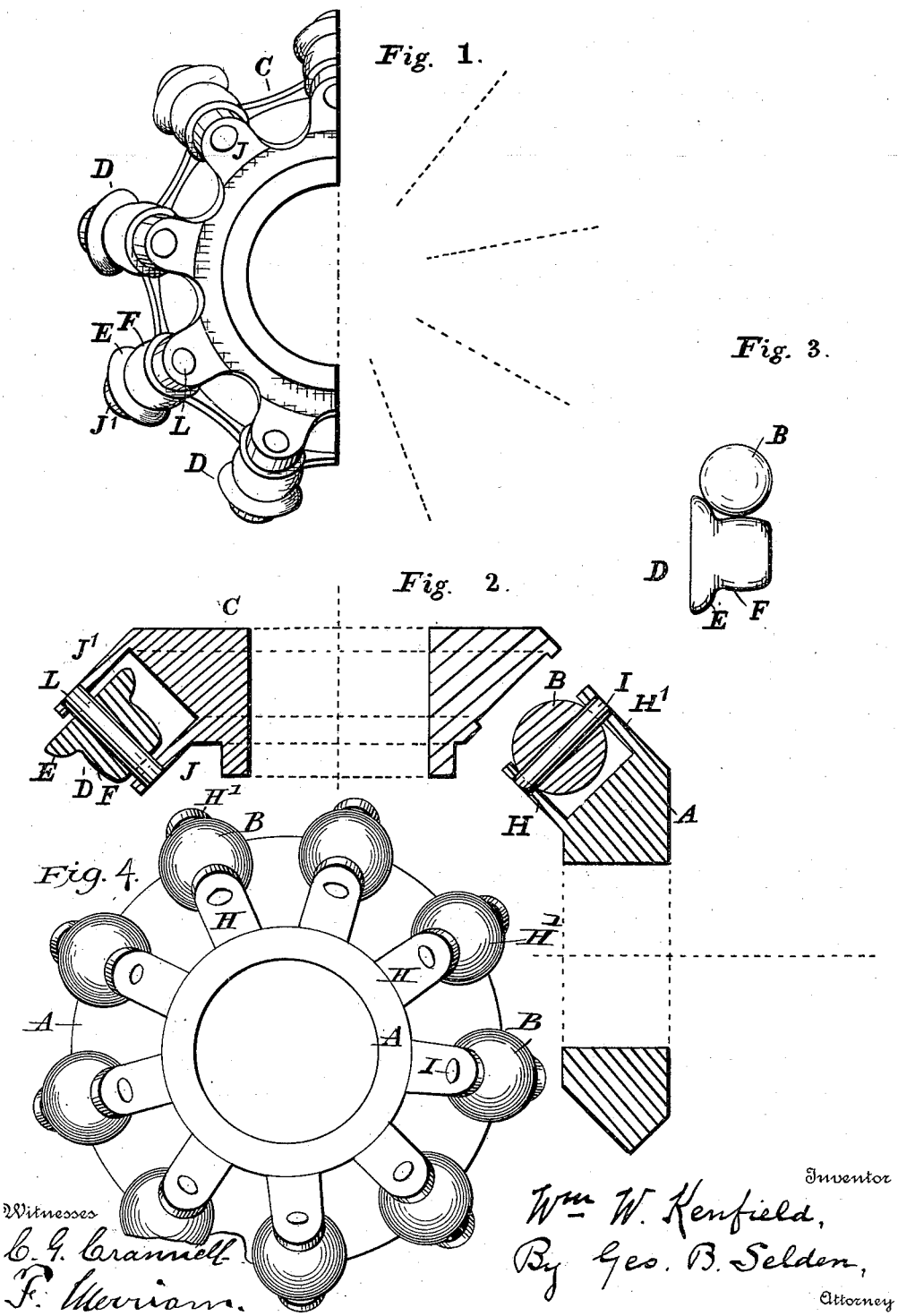
Witnesses
C. G. Crannell
F. Merriam
Inventor
Wm. W. Kenfield,
By Geo. B. Selden,
Attorney

UNITED STATES PATENT OFFICE.

WILLIAM W. KENFIELD, OF ROCHESTER, NEW YORK, ASSIGNOR TO THE ROCHESTER CYCLE MANUFACTURING COMPANY, OF SAME PLACE.

GEARING.

SPECIFICATION forming part of Letters Patent No. 628,407, dated July 4, 1899.

Application filed April 21, 1899. Serial No. 713,906. (No model.)

*To all whom it may concern:*

Be it known that I, WILLIAM W. KENFIELD, a citizen of the United States, residing at Rochester, New York, have invented certain Improvements in Gearing, of which the following is a specification, reference being had to the accompanying drawings.

My invention relates to certain improvements in the construction of ball-and-spool gearing whereby the efficiency and durability of such devices are increased.

My invention is fully described and illustrated in the following specification and the accompanying drawings, the novel features thereof being specified in the claims annexed to the said specification.

In the accompanying drawings, Figure 1 is a partial elevation of one of the rotary disks of my improved gearing, showing the spools. Fig. 2 is a central section through the shafts. Fig. 3 is a diagram showing the contact between one of the balls and its coöperating spool. Fig. 4 is a face elevation of a ball-gear adapted to engage with the spool-gear represented in Fig. 1.

A represents a disk or other suitable rotary member of a pair of gears, and B a series of balls arranged at suitable distances apart around its periphery. The disk may be of any suitable dimensions and any preferred number of balls may be employed. The disk may be provided with the lugs H H', supporting the pins or studs I, which carry the balls. The balls may revolve on the pins, or they may be fixed rigidly, so they cannot revolve, or they may be attached to the disk in any other suitable or preferred manner.

C represents the other disk or rotary member, which is provided with the spools D, supported by the lugs J J' and pin L. The spool has two convex bearing-surfaces, which bear on the coöperating ball at two different points, as indicated in Fig. 3. These convex surfaces E and F are arranged at an angle with each other and with the axis of the spool, so that the point where the convex surface F bears on the ball is nearer the axis than the other bearing-point, and it is also placed on the inner end of the spool. The lugs J J' may be so situated as to allow the spool to adjust itself laterally on the pin L. The convex surfaces may be spherical; but any other suitable curved shape will produce a smooth-running gear. The relative dimensions of the balls and spools may be widely varied without departure from the principles of my invention, which by means of the inner convex surface reduces the action in front of the line of centers and allows the free disengagement of the ball from the spool with the minimum amount of friction.

My improved gearing is designed more particularly for use on so-called "chainless" bicycles; but it will be obvious that it can be applied to many other purposes.

In the accompanying drawings my improvement is shown as applied to miter-bevels; but it can be used on other kinds of bevels and also on spur and other gears.

I claim—

1. The combination with a rotary member provided with a series of balls arranged at equal distances apart around its periphery, of another rotary member provided with a series of spools, each having two convex bearing-surfaces adapted to engage with its coöperating ball, as and for the purposes set forth.

2. The combination with a rotary member provided with a series of balls arranged at equal distances apart around its periphery, of another rotary member provided with a series of spools, each having two convex bearing-surfaces arranged at different angles with the axis and adapted to engage with its coöperating ball, as and for the purposes set forth.

3. The combination with a rotary member provided with a series of balls arranged at equal distances apart around its periphery, of another rotary member provided with a series of spools, each having two convex bearing-surfaces of different diameters adapted to engage with its coöperating ball with the smaller bearing-surfaces at the inner ends of the spools, as and for the purposes set forth.

WILLIAM W. KENFIELD.

Witnesses:
GEO. B. SELDEN,
C. G. CRAMRELL.